INVENTORS
DAVID D. PETTIGREW
EDWARD C. WARRICK

Dec. 30, 1958 D. D. PETTIGREW ET AL 2,866,348
SHIFTER FOR POWER TRANSMISSION
Filed Dec. 28, 1956 3 Sheets-Sheet 2

INVENTORS
DAVID D. PETTIGREW
EDWARD C. WARRICK

BY Strauch, Nolan & Neale

ATTORNEYS

Dec. 30, 1958    D. D. PETTIGREW ET AL    2,866,348
SHIFTER FOR POWER TRANSMISSION
Filed Dec. 28, 1956    3 Sheets-Sheet 3
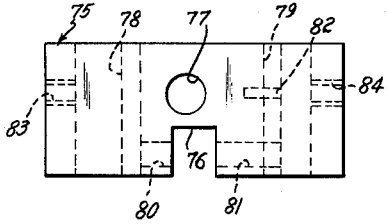
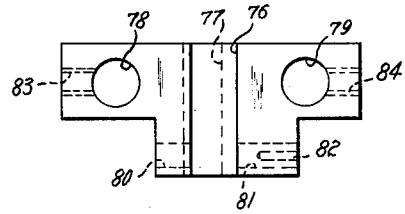
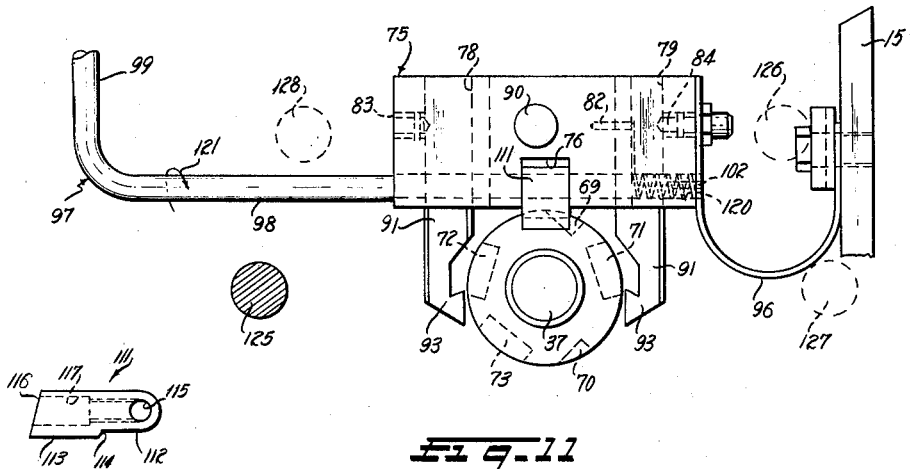
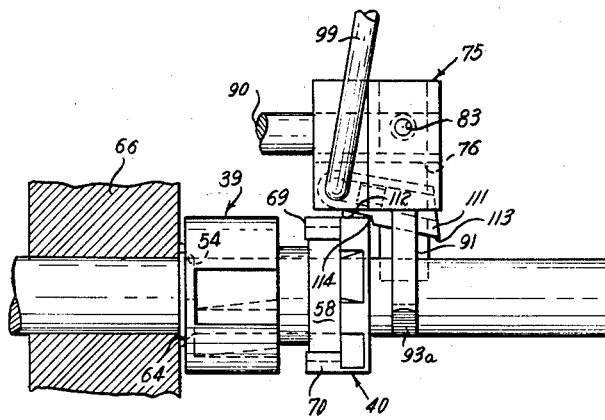
INVENTORS
DAVID D. PETTIGREW
EDWARD C. WARRICK
BY
ATTORNEYS United States Patent Office 2,866,348
Patented Dec. 30, 1958

2,866,348

SHIFTER FOR POWER TRANSMISSION

David D. Pettigrew and Edward C. Warrick, Pittsburgh, Pa., assignors to Rockwell Manufacturing Company, Pittsburgh, Pa., a corporation of Pennsylvania Application December 28, 1956, Serial No. 631,285

12 Claims. (Cl. 74—335)

This invention relates to an improvement in control mechanisms for drive transmissions in power tools such as lathes and more particularly to a mechanism for preventing the operation of the control mechanism when the transmission is in operation. While the novel control mechanism of this invention may be used on various power transmissions, for convenience it will be illustrated and described as applied to a lathe power transmission of the type described in U. S. Patent No. 2,773,-395 issued December 11, 1956.

In the lathe power transmission of the above patent, the transmission can be shifted to provide spindle conditions comprising direct drive, back-gear drive, loose spindle, and locked spindle. In direct drive, there is a direct clutch connection between the spindle drive pulley and the spindle, thus the spindle rotates at the same speed as the spindle pulley. The back-gear drive is a speed reduction gear system whereby the spindle's rotational speed is greatly reduced from the speed of the drive pulley. In loose spindle condition, neither the direct drive nor the back-gear drive is engaged whereby the spindle can be easily rotated to facilitate indicating and other operations on work mounted on the lathe. In locked spindle condition, both the direct drive and back-gear drive are engaged, thereby preventing rotation of the spindle so chucks can be replaced and work pieces mounted thereon.

The power transmission disclosed in the above patent provides a simple and effective means for shifting to desired spindle condition when the drive is at rest. Because shifting is so easily achieved, it has been found that operators, particularly those with little experience who are learning the operation, frequently attempt to shift from one spindle condition to another while the drive is in motion. This usually results in damage to the gears or to the clutch mechanism utilized in the transmission.

Accordingly, it is the primary object of the present invention to provide a shifter interlock mechanism which, while providing a simple and effective means for shifting the transmission to achieve various spindle conditions, will prevent any attempt to shift from one spindle condition to another while the drive is in motion, and will insure that the transmisison is brought to a complete stop before any shifting from one spindle condition to another can be accomplished.

Other objects of the invention will, in part, be obvious, and will, in part, appear hereinafter.

For a fuller understanding of the nature and objects of the invention, reference should be had to the following detailed description and drawing, in which:

Figure 9 is a front view of a pivot block;

Figure 10 is a bottom view of the pivot block;

Figure 11 is a front view of the shifter interlock assembly;

Figure 12 is a side view of the shifter interlock assembly;

Figure 13 is a side view of a pivot arm; and

Figure 14 is a side view of the cam follower.

Figure 1:
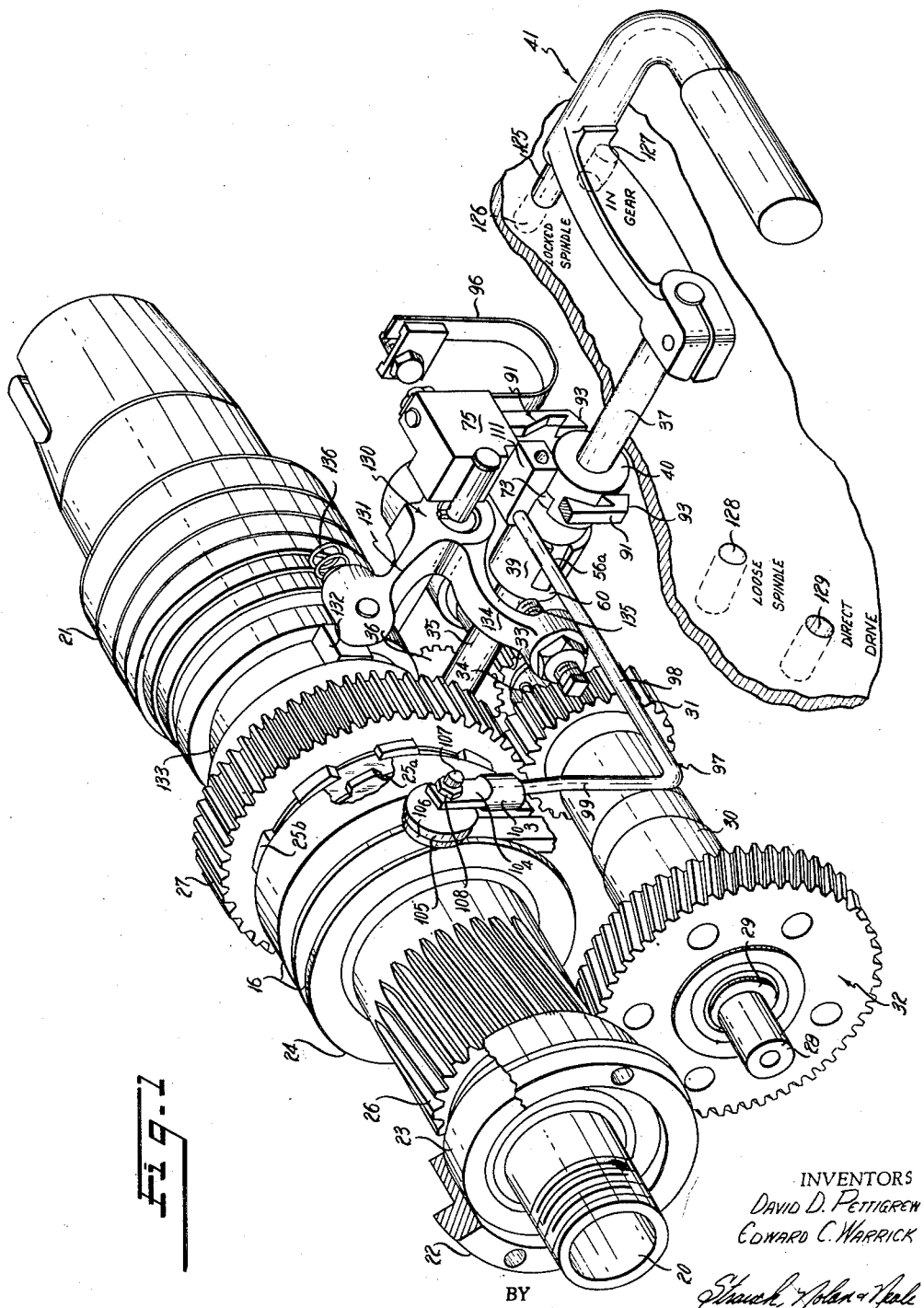
Figure 1 is a perspective view of the interior of the lathe head stock having a direct driven and back-gear spindle, a shifter mechanism for shifting the back-gear and direct drive relative to each other to provide the various spindle conditions and an interlock preventing shifting from one spindle condition to another while the drive is in motion.

Referring now more particularly to the drawings, Figure 1 illustrates a lathe spindle and associated drive and control mechanism removed from its housing and support structure, which is preferably of the type disclosed in U. S. Patent No. 2,773,395. The spindle 20 is rotatably supported adjacent its front and rear ends in bearings held in front and rear bearing retainers, 21 and 22, respectively, the latter carrying bearing 23 and the former carrying similar bearing, not shown. Retainers 21 and 22 are suitably mounted in a head stock housing (not shown) of the type shown in U. S. Patent No. 2,773,395. A spindle pulley 24 is rotatably journalled on the spindle 20 by suitable bearings (not shown). Integrally formed on the front and rear sides, respectively, of the spindle pulley 24 are clutch jaws 25a, and a gear 26. Spindle gear 27 is keyed to the spindle 20 so that it rotates with the spindle 20 but is free to move axially relative thereto.

A back shaft 28, having an eccentric portion 29, is mounted for rotational movement about the axis of shaft 28 in the same manner as that disclosed in the above mentioned patent. A sleeve 30 having gear 31 formed integrally on one end thereof is journalled on eccentric portion 29 of the shaft 28. On the other end of sleeve 30, opposite gear 31, a spur gear 32 is fixed by any convenient means for rotation with the sleeve 30. It will be noted that by rotating shaft 28 about its axis, gears 32 and 31 will be engaged or disengaged with gears 26 and 27 respectively. A spiral gear 33 for rotating shaft 28 is pinned thereon by means of a set screw 34, adjacent gear 31.

Figure 2:
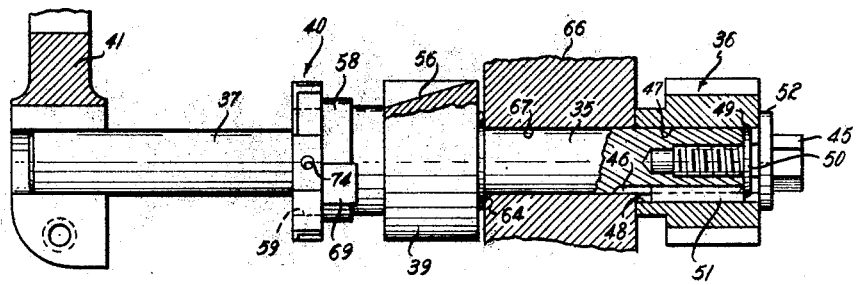
Figure 2 is a side elevation of the shifter assembly, with parts broken away to show detail.

A gear shaft 35, non-rotatably carrying a worm gear 36, is supported for rotation about its axis at right angles to the axis of shaft 28 by a boss 66 as shown in Figure 2. The worm gear 36 meshes with gear 33 so that upon rotation of the shaft 35, the shaft 28 is rotated about its axis to bring the gears 32 and 31 into engagement or disengagement with gears 26 and 27 for desired spindle conditions.

Figure 3:
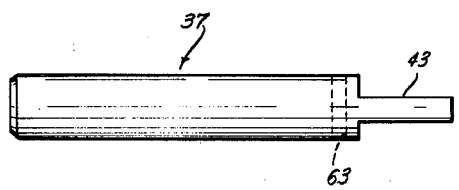
Figure 3 is a side elevation of a shaft on which a part of the shifter assembly is mounted.
Figure 4:
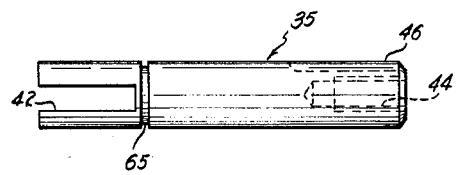
Figure 4 is a side elevation of a shaft which cooperates with the shaft of Figure 3 and on which another part of the shifter assembly is mounted.
Figure 5:
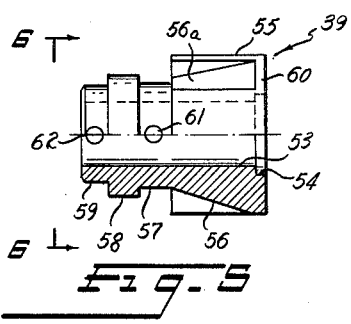
Figure 5 is a side elevation of the clutch cam, with parts broken away to show detail.
Figure 6:
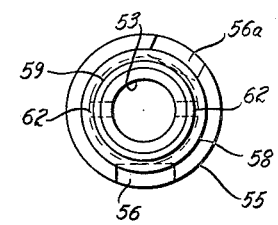
Figure 6 is an end view of the clutch cam as viewed in the direction of the arrows 6—6 in Figure 5.
Figure 7:
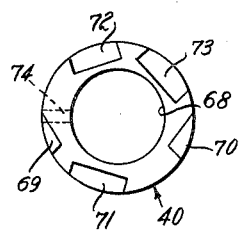
Figure 7 is an end view of the interlock cam.
Figure 8:
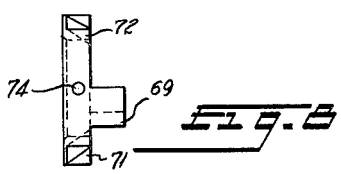
Figure 8 is a side view of the interlock cam.

The shifter assembly shown in Figures 1 and 2 comprises a shifter shaft 37 shown in detail in Figure 3, the worm gear shaft 35 shown in detail in Figure 4, a clutch cam 39, details of which are shown in Figures 5 and 6, a locking cam 40 which is shown in detail in Figures 7 and 8. A shifter handle 41 is secured to the outer end of shaft 37, as shown in Figures 1 and 2.

Referring particularly to Figures 2, 3 and 4, the worm gear shaft 35 has an axially extending diametrical slot 42 cut into it, which slot extends axially approximately one-quarter of the length of the shaft. The adjoining end of the shifter shaft 37 has a tongue 43 which is adapted to be received into the slot 42, so that when the shaft 37 and the shaft 35 are mounted in the shifter assembly shown in Figure 2, the tongue 43 projects into the slot 42, thus allowing a certain amount of axial movement of the shaft 37 relative to the shaft 35 while maintaining a rotary drive connection therebetween.

As shown in Figures 2 and 4, the end of shaft 35 opposite the groove 42 has a tapped axially extending opening 44 adapted to receive a screw 45 and a keyway slot 46 for keying the worm gear 36 thereon. The worm gear 36 has an internal bore 47, an axial keyway slot 48 and an annular groove 49 adjacent the outer end thereof. The shaft 35 is inserted into the bore 47 until it abuts against a snap ring 50 which is received in the annular groove 49. A key 51 is inserted into the radially aligned keyway slots 46 and 48 to fix the gear 36 against rotary motion relative to the shaft 35. The screw 45 is threaded into the opening 44 and by means of a washer 52; the end of the shaft 35 and the snap ring 50 are brought into tight abutting contact to rigidly fix the gear 36 on the shaft 35.

The clutch cam 39, as shown in Figures 5 and 6, has an internal axial bore 53 and a counterbore 54. The outer cylindrical surface 55 of cam 39 is interrupted by sloping cam surfaces 56 and 56a which terminate in a reduced cylindrical groove 57. A further reduced cylindrical end section 59 and an annular collar 58 are provided as shown. The sloping surfaces 56 and 56a slope upwardly from the groove 57 and merge with the cylindrical surface at a point axially spaced from the right end of the cam, as viewed in Figure 5, to form a narrow continuous uninterrupted cylindrical surface 60. Holes 61 and 62 are drilled diametrically through the cam in groove 57 and reduced end portion 59 respectively. As shown more clearly in Figure 6, the sloping surfaces 56 and 56a are angularly displaced by an angle of approximately 148°. The clutch cam 39 is nonrotatably mounted on shaft 35 in surrounding relation with the tongue 43 by a pin driven through the hole 61 into a hole 63 in the shaft 37. The clutch cam 39 is thus fixed to the shaft 37 but is free to move axially with respect to shaft 35.

As shown in Figures 2 and 4, the shaft 35 has an annular groove 65 milled into its periphery closely adjacent the end of slot 42. The shaft 35 is fixed against axial motion in boss 66 by the gear 36 and the snap ring 64 which is mounted in the groove 65. When the shaft 37 is moved to the right, as viewed in Figure 2, as far as it can go, the end surface of the clutch cam 39 will be closely adjacent the boss 66 and the snap ring 64 will extend partly into the counterbore 54 in the clutch cam 39.

As shown in Figures 7 and 8, locking cam 40 comprises an annular body portion having a bore 68 extending axially therethrough, and ears or projections 69 and 70 which extend axially from one of the vertical side walls. Surfaces 71, 72 and 73 extending from the periphery of the cam 40 toward the projections 69 and 70 are provided as shown. When mounted in the assembly shown in Figure 2, the cam 40 is received on reduced cylindrical portion 59 of the clutch cam 39 so that ears 69 and 70 extend over the annular collar 58. The reduced portion 59 on the cam 39 extends into the bore 68 of the cam 40 and the inner vertical wall of the cam 40 fits snugly against the collar 58 on the cam 39. The cam 40 (Figure 8) is fixed in this position by a pin driven through a hole 74 into the aligned hole 62 in the cam 39.

A T-shaped pivot block 75 is shown in Figures 9 and 10 in detail and is shown partly in section in Figure 1. A bore 77 extends through the pivot block at a position slightly above the top of a slot 76 in the bottom surface of the block and parallel thereto. Bores 78 and 79 extend vertically through each of the arms of the T with their axes at right angles to a plane containing the axis of bore 77. Extending laterally through the leg of the T near the bottom surface of the pivot block are axially aligned horizontal bores 80 and 81. A small hole 82 is drilled into the side surface of the leg of the T vertically spaced above the bore 80 when the pivot box is viewed from the front, as shown in Figure 9. Tapped holes 83 and 84 extend from the outer surfaces of the opposite arms of the T and into bores 78 and 79 respectively.

As best shown in Figures 1, 11 and 12, a shaft 90 is received in bore 76 to rockably support pivot block 75. The shaft 90 is in turn rotatably journalled in boss 66 and supported thereby in parallel spaced relationship to the shafts 37 and 35. The lower ends of two arms 91, the details of which are shown in Figure 13, are milled to form a hook portion 93, which portion has opposed flat surfaces 92 milled thereon. A detent 94 is spot drilled into the circular portion of the arm 91 diametrically to the opposite end of the hook. The round portions of these arms are mounted in bores 78 and 79 in such a manner that the hooks of each arm face each other, as shown in Figure 11. The arms 91 are secured tightly in bores 78 and 79 by means of set screws threaded into tapped holes 83 and 84 (Figure 11), the ends of the screws extending into detents 94.

As shown in Figure 11, one end of a leaf spring 96 is secured by any convenient means to the outer surface of one arm of the T-shaped pivot block 75, the other end of the spring 96 being secured by some convenient means to the interior of the housing casting here designated by numeral 15. The pivot block is shown in its normal substantially horizontal position in Figure 11. In this position, the two arms 91 straddle the locking cam 40 in closely spaced relation but do not contact it. Any tendency to pivot the pivot block about the axis of shaft 90 in either direction so as to bring either of the arms 91 into contact with the locking cam 40 will be resisted by a pressure of spring 96.

Referring particularly to Figures 1, 11 and 12, a trip rod 97 has two legs or extensions 98 and 99 at right angles to each other. The extreme end of the horizontal leg 98 has a slot 102 cut into it (Figure 11) while the extreme end of the vertical leg 99 carries an extension 103, having a flat portion 104 (Figure 1). A friction pad holder 105 to which there is secured by means of glue or any other adhesive, a leather friction pad 106, is attached to flat portion 104 by screw 107 and nut 108. When mounted in the shifter interlock assembly, as shown in Figures 1, 11 and 12, the free end of the horizontal leg 98 is rotatably received in aligned bores 80 and 81 of pivot block 75.

Mounted on the portion of the leg 98 which extends across slot 76 in the pivot block is a cam follower 111. The cam follower, the details of which are shown in Figure 14, has flat surfaces 112 and 113 on the lower side thereof connected by an intermediate sloping surface 114. A bore 115 extends laterally through the end of the cam follower which is opposite to the sloping end face 116. A hole 117 is drilled and tapped which extends from the end face 116 to the lateral bore 115. In assembling the trip rod 97, the cam follower 111 and the pivot block 75 together, the cam follower 111 is inserted into slot 76 so that its bore 115 is aligned with bores 80 and 81 in the pivot block with the surfaces 112 and 113 facing downwardly, as best shown in Figure 12. The free end of leg 98 is then inserted into aligned bores 80 and 115 and 81.

A set screw is threaded into the tapped hole 117 to rigidly fix the cam follower to the horizontal arm 98 within the slot 76. The extreme end of the leg 98 extends out the bore 81 beyond the leg of the T-shaped pivot block for approximately one-half inch. A coil spring 120 is received over the free end of the leg 98, one end of which is inserted into the hole 82 in the pivot block, the other end of which is held in the slot 102 on the end of the horizontal leg 98 to urge the trip rod 97 about its axis relative to the pivot block 75 in the direction shown by the arrow 121 in Figure 11.

When the trip rod 97 is mounted in position in the interlock assembly and when the pivot box 75 is its normally horizontal position, the friction pad 106 is facing and closely adjacent to but out of contact with the V-belts 16 which drive the spindle pulley 24. The various spindle conditions are obtained by rotating the handle 41 to the various positions shown in phantom lines in Figure 1. These various positions are designated on an indicator fixed to the outside of the head stock housing, and it will be noted that all spindle conditions can be obtained by rotating the handle 41 and the shaft 37 through an arc of 180°, the direct drive position and the in-gear position being 180° apart.

The operation of the shifter mechanism will now be described without reference to the interlock mechanism. The desired spindle position is obtained by first rotating the handle 41 to the desired position, and then pushing the handle 41 and the shaft 37 axially inwardly so that the extension 125 on the handle 41 is pushed into one of the holes 126, 127, 128 or 129 in the head stock, which locate the handle in the positions corresponding to the various spindle conditions desired.

In order for the spindle to be in direct drive—that is, to be directly driven at the speed of rotation of the spindle pulley 24, it is necessary that the pulley 24 be directly connected to the gear 27 by engaging clutch jaws 25b. The clutch 25b is controlled by a bell crank 130, non-rotatably mounted on the shaft 90. The upper arm 131 of the bell crank carries a shoe 132 which rides in a groove 133 in an extension of gear 27. The lower arm 134 of the bell crank adjustably carries a cam follower screw 135 urged against the cam 39 by spring 136. A back lever (not shown) is non-rotatably mounted on shaft 90 on the opposite side of spindle 20, as shown in U. S. Patent No. 2,773,395, and moves in unison with bell crank 130 to control clutch 25b.

Also for direct drive, the back gear drive comprising gears 32 and 31 must be disengaged from gears 26 and 27 respectively. As the handle 41, and consequently the shafts 37 and 35, are rotated from the positions shown in Figure 1 to a position where the pin 125 is opposite the hole 129, the worm gear 36 in mesh with gear 33 causes the shaft 28 to rotate about its axis to disengage the gears 32 and 31 from gears 26 and 27, respectively. During this rotation, however, the end of cam follower screw 135 rides on cylindrical surface 60 of clutch cam 39, thus maintaining the bell crank 130 in such a position that the clutch 25 is held in a disengaged position. When the pin 125 is opposite the direct drive hole 129, the sloping surface 56 on the clutch cam 39 is aligned with the end of the cam follower screw 135 so that when the handle 41 and shaft 37 are moved axially inwardly at this rotated position to insert the pin 125 into the hole 129, the end of the cam follower screw rides down on the sloping surface 56 allowing the bell crank 130 to rock on shaft 90 under the influence of the spring 136 which shifts the gear 27 axially to engage the clutch 25, thereby establishing a direct drive between the spindle pulley 24 and the spindle 20. It will be noted that this spindle condition is not obtained until shaft 37 and handle 41 have been rotated to the proper position and the shaft 37 and the cam 39 have been moved axially inwardly.

When the transmission is at rest, in order to shift the mechanism to provide a loose spindle condition, all that is necessary is to pull the handle 41 and the shaft 37 and the cam 39 axially outwardly toward the operator to disengage the clutch 25. Thus, by moving the shaft 37 and cam 39 outwardly toward the operator, the end of cam follower screw 135 is caused to ride up on the sloping surface 56 until it bears against the cylindrical surface 60. This causes the bell crank and the shaft 90 to rock in a clockwise direction against the pressure of the spring 136 to move the gear 27 axially, thereby disengaging the clutch 25. Although it is not necessary to push the handle 41 and the shaft 37 axially inward in order to achieve the loose spindle position, a hole 128 is provided to definitely locate the loose spindle condition at a position separate and distinct from the direct drive position. As the shaft 37 and the cam 39 are rotated from the direct drive position to the lose spindle position, the sloping surface 56 will be removed from a position in alignment with the end of the cam follower screw 135 so that axial movement of the shaft 37 and the cam 39 inwardly will not permit counter clockwise rocking motion of the bell crank.

In order to shift the shifter mechanism to achieve a locked spindle condition, the handle 41 and the shaft 37 and cams 39 and 40 are rotated in a clockwise direction, as viewed in Figure 1 to a position where the pin 125 is opposite the hole 126. This angular rotation of the shafts 37 and 35 causes rotation of the shaft 28 which rotates the eccentric portion 29 to bring the gears 32 and 31 into engagement respectively with gears 26 and 27. Since it was necessary to move the shaft 37 and cam 39 axially outwardly toward the operator in order to remove the pin 125 from hole, during this rotation the cam follower screw rides on the cylindrical surface 60 which, as above explained, holds the clutch 25 in a disengaged position. When the shafts 37 and 35 and cam 39 and handle 41 have been rotated a sufficient angular distance to engage the back gear drive, the pin 125 will be opposite the hole 126 which defines the locked spindle condition. During this rotation of handle 41, the cam 39 will be rotated so that the inclined surface 56a, as shown in Figure 1, is brought into alignment with the end of the cam follower screw 135. In this rotated position of the shafts 35 and 37, back gears are engaged so that axial movement of the handle 41 and shaft 37 and cam 39 inwardly to insert the pin 125 into the locked spindle hole 126 will allow the end of the cam follower screw 135 to ride down on the surface 56a, allowing the bell crank 130 to rock in a counter clockwise direction under the influence of spring 136 causing the clutch 25 to engage the spindle pulley 24 and the gear 27. In this condition, both the direct drive and the back gear drive are in engagement and the spindle is therefore locked against any rotation.

In order to place the spindle in a back gear drive position, it is first necessary to free the pin 125 from the locked spindle hole 126 by moving the handle 41, the shaft 37 and the cam 39 axially outwardly. This causes the cam follower pin 135 to ride up on the surface 56a and bear on the cylindrical surface 60, thus rocking the bell crank to disengage the clutch 25, freeing the spindle from direct drive engagement with the spindle pulley 24. In this position, the drive is from the spindle pulley 24, the gear 26 to the gear 32 to the gear 31 to the gear 27. Although the transmission is now in back gear drive, in order to provide a position which is separate and distinct from the locked spindle condition, the "in-gear" hole 127 is circumferentially spaced in a clockwise direction from the locked spindle hole 126. Rotation of the handle 41 and shaft 37 and cam 39 to a point where the pin 125 is opposite the hole 127 will not have any effect on the spindle condition since this amount of rotation does not cause sufficient rotation of the shaft 28 and eccentric portion 29 to disengage the back gears 31 and 32. However, rotation of the handle 41 to bring the pin 125 opposite the hole 127 will remove the sloping surface 56a from alignment with the end of cam follower screw 135 so the handle 41, shaft 37 and cam 39 may be moved axially inward to insert the pin 125 into the hole 127.

A 180° rotation of the handle 41 will cause a like 180° rotation of the shaft 28 and eccentric portion 29 so that as the handle 41 is rotated from a position directly opposite the direct drive position 129 where the back gears 32 and 31 are disengaged from gears 26 and 27 respectively, to a position where the handle is opposite the in-gear position 127, the eccentric 29 and the shaft 28 will be rotated 180° to bring the gears 32 and 31 into full mesh with gears 26 and 27 respectively. The engagement of the back gear (gears 32 and 31) with gears 26 and 27 takes place when the handle 41 is in approximately vertical position. Thus, for any position of the handle 41 between the direct drive position and its approximate vertical position hereinafter referred to as the "left quadrant," the back gear train will be disengaged and for any position of the handle 41 between its approximate vertical position and the in-gear position hereinafter referred to as the "right quadrant," the back gear drive will be engaged. Thus it will be seen that engagement and disengagement of the back gear drive are controlled by rotary motion of the shafts 37 and 35 while engagement and disengagement of the clutch 25 are controlled by axial position of the cam 39. It is therefore necessary to prevent axial motion of the shaft 37 and cam 39 in certain spindle conditions as well as rotary motion of the shaft 37 when the transmission is being driven by the belts 16.

When the handle 41 is in the direct drive position so that the pin 125 is projecting into the direct drive hole 129, the rotary position of the shafts 35 and 37 is such that the back gears are disengaged and the sloping surface 56 of cam 39 is aligned with follower screw 135. If the transmission is in motion and being driven by the belts 16, any attempt by the operator to move the shifter handle 41 to a different position would necessitate first an attempt to pull the handle 41 and shaft 37 axially outward. As above explained, this outward axial motion of the shaft 37 and the cam 39, if permitted, would cause the disengagement of the clutch 29 which, if it took place while the drive was in motion, would cause damage to the clutch jaws 25a and 25b. It is therefore necessary to prevent any substantial axial motion of the shaft 37 when the handle 41 is in a direct drive position when the power is being supplied to drive the belt and spindle pulley 24.

In the direct drive position, the relative axial positions of the clutch cam 39 and the interlock cam 40 and the arms 91 and the cam follower 111 are shown as they are in Figures 11 and 12. In this position, the peripheral edge of the interlock cam 40 abuts against the intermediate sloping surface 114 of cam follower 111. Thus, any slight axially outward motion of the shaft 37 will cause the interlock cam to rock cam follower 111 and the trip rod 97 about the axis of leg 98 which immediately brings the leather friction pad 106 into contact with the moving belts 16. Contact of the pad 106 with the moving belts 16 will rock the pivot block 75 about the axis of shaft 90, thereby bringing one of the hook portions 93 of an arm 91 into the path of locking cam 40. This, of course, prevents any substantial axial movement of the cam 39 and thereby prevents disengagement of the clutch 25.

It will sometimes happen that the shaft 37 and handle 41 and cam 39 will be in an outward axial position before the drive to the lathe spindle is started. For any position of the handle 41 in the left quadrant the back gear drive will be disengaged. Therefore, when the handle 41 is in an outward axial position in the left quadrant, it is necessary to prevent axially inward movement of the elements (which would have the effect of engaging the clutch 25) and to prevent rotational movement of the elements beyond the vertical position of the handle 41 (which would have the effect of engaging the back gear) while the belts 16 are moving.

Assuming that the handle 41 is opposite the direct drive hole 129 but in its outward axial position before the lathe is started, the cams 40 and 39 will be in such a position that the main body of the interlock cam 40 will be axially outward of the hooks 93. Also, in this position the surface 113 of cam follower 111 will bear against the outer cylindrical surface of the locking cam 40 so the cam follower 111 will be displaced upwardly from that shown in Figure 12 and the trip arm 97 will be rocked so that the pad 106 is in contact with the belts 16. If the drive to the lathe head stock is put in motion with the elements in this position, the pivot block 75 will be rocked either clockwise or counterwise depending upon the direction of rotation of belts 16, about the axis of shaft 90 to bring one of the hook portions 93 of the arms 91 into position behind the inner surface of the locking cam 40. Thus, any attempt to move the shaft 37 axially inwardly will bring the hook 93 into contact and in abutting relation with the inner surface of the locking cam 40, thereby preventing any further axial movement of the shaft 37 and the handle 41. In this position, one of the hook portions 93 is also in the path of movement of the ears 69 and 70 so that any attempt to rotate the shaft 37 and handle 41 beyond the approximate vertical position of the handle 41 will bring an ear 69 or 70 into abutment with the bottom of one of the hook portions 93, thereby preventing any further rotational motion of the handle 41. Thus, shifting from a loose spindle condition to a direct drive or back gear drive while the transmission is in motion is prevented.

Assuming that the transmission is at rest so that the interlock mechanism is not effective (Figures 11 and 12), clockwise rotation of the handle 41 beyond its vertical position into the right quadrant causes the gears 32 and 31 to mesh with gears 26 and 27 respectively. When the shaft 37, cam 39 and handle 41 are axially displaced outwardly and rotated to any position within the right quadrant, the cam follower screw 135 will ride on the portion 60 of cam 39. Thus the clutch 25 will be disengaged for any position of the handle 41 in the right quadrant so long as it is in its axially outward position. For any position in the right quadrant of the handle 41 and when it is displaced axially outwardly, the transmission will be in back gear drive. Therefore, by rotating the handle 41 to the position where the pin 125 is opposite the recess 126, the transmission will still be in back gear condition. In this position, as shown in Figure 1, the sloping surface 56a is in alignment with the end of cam follower screw 135 and inward displacement of cam 39 allows the clutch 25 to engage as above explained to bring about a locked spindle condition.

It sometimes happens that the lathe is started when the handle 41 is in the right quadrant. When the handle 41 is in this quadrant and in its axially outward position, the transmission will be in a back gear drive. Thus, any attempt to push the handle in so that the pin 125 is received in a locked spindle recess 126 when power is being supplied to the transmission will result in damage to the clutch 25 since the spindle pulley 24 is rotating at a much greater speed than the gear 27.

Axial inward movement of the handle 41, when it is in any position in the right quadrant, except opposite the in-gear position, is prevented when the transmission is in motion as follows. Referring to Figures 1, 11 and 12, when the shaft 37 is in its axially outward position, the surface 113 of follower cam 111 will bear against the periphery of locking cam 40 so that the trip arm 97 will be in its rocked position causing the leather pad 106 to bear against the belts 16. Also, in this position the collar 58 and ears 69 and 70 will be in alignment with hooks 93. If the drive to the spindle pulley is started under these conditions, the friction between the pad 106 and belts 16 will cause the pivot block 75 to rock about the axis of shaft 90, thereby bringing either one of the hook portions 93 (depending on the direction of travel of the belts 16) into the path of travel of either the ear 69 or 70 on the locking cam 40 and behind the inner surface of the body of the locking cam. Thus, any attempt to rotate the handle 41 beyond its vertical position is prevented by engagement of either of the ears 69 or 70 and any axially inward motion of the shaft 37 and the locking cam 40 and handle 41 will be obstructed by one of the hook portions 93 abutting against the inner surface of the cam 40.

As has been described above, any axially inward motion of the handle 41, when the pin 125 is opposite either locked spindle recess 126 or the direct drive recess 129, will result in a change of the spindle condition. In the former case, a change of spindle condition would be from the in-gear to the locked spindle condition and then the latter case from the loose spindle condition to the direct drive.

It should be noted that whenever the cam 39, shaft 37 and handle 41 are in their axially outward position, the surface 113 of cam follower 111 bears against the periphery of locking cam 40 and the friction pad 106 is therefore in engagement with the belts 16. Also in this position, the collar 58 is aligned with the hooks 93. Therefore, whenever the lathe drive is put in motion, the pivot block 75 will be rocked to place one of the hook portions 93, depending on the direction of motion of belts 16, in a position behind the inner surface of locking cam 40 and in the path of rotation of the ears 69 and 70. In the position of the ears 69 and 70 and hook portions 93, as shown in Figure 11, the handle 41 is opposite the direct position in the left quadrant and the drive is at rest. If the elements are all in the axially outward position and the drive is put in motion so that the belts 16 (Figure 1) are moving downward, the left hook portion 93 will swing into the rotary path of the ear 70. The ear 70 is located so as to permit rotation of the handle 41 and cam 40 approximately 90° before the ear 70 abuts against the lower surface of the left hook portion 93, thereby blocking further rotary movement of the handle 41 beyond the approximate vertical position thereof, at which point the back gear train is engaged. If, under the same circumstances, the drive is set in motion in such a direction that the belts 16 are moving upwardly, the right hook portion 93 would be rocked into the path of rotational movement of the ear 69. In this case, the handle 41 and locking cam 40 could be rotated approximately 90° before ear 69 engaged the inner surface of the right hook portion 93.

Similarly, when the handle 41 is in the right quadrant and in its axially outward position, any attempt to rotate the handle in a counter clockwise direction beyond the vertical position when the belts 16 are moving downwardly will be prevented by engagement of the ear 70 with the left hook portion 93. If the belts are moving upwardly, any attempt to move the handle 41 in a counterclockwise direction will bring the ear 69 into engagement with the bottom of the right hook portion 93 at the approximate vertical position of the handle 41 thus preventing further movement beyond this point.

As described above, when the handle 41 is in its axially outward position, it can be rotated to any position in the left quadrant short of the approximate vertical position and in all such positions, the transmission will be in its loose spindle condition since, in all such positions, the back gears will be disengaged and the cam follower screw 135 will bear against the surface 60, thereby maintaining the clutch 25 disengaged. Any attempt while the drive is in motion to move the handle 41 axially inward, when the pin 126 is opposite the direct drive recess 129 will be blocked by engagement of hook portions 93 with the inner surface of locking cam 40. However, in this situation, if the handle 41 were rotated to bring pin 125 opposite the loose spindle recess 128 with the handle in the outer position, the sloping surface 73 on locking cam 40 is aligned with the left hook portion 93 and the sloping surface 71 is aligned with right hook portion 93. In this position, the handle 41, cam 39 and 40 and shaft 37 may be moved axially inward, causing either the left hook portion 93 to ride up on sloping surface 73 or the right hook portion 93 to ride up on sloping surface 71, depending on the direction of movement of the belts 16. This has the effect of rocking the pivot block 75 to its neutral position shown in Figure 11, thereby freeing the pad 106 from engagement with the belts 16. It is to be noticed that no change in spindle condition takes place in moving the handle axially inward when the pin 125 is opposite the loose spindle recess 128. All that happens is that the pad 106 is disengaged from the belt, thereby preventing undue belt and pad wear and loss of power when the transmission is in the loose spindle condition. However, once the pin 125 is in the recess 128, axial outward movement of the handle 41 is prevented while the drive is in motion. In such a case any attempt to move the handle 41 outwardly will bring the peripheral edge of the locking cam against the sloping surface 114, bring the pad 106 into engagement with the moving belts 16. This again causes the pivot block 75 to rock, bringing one of the hook portions 93 into the path of further axially outward movement of the locking cam 40.

As above explained, when the handle 41 is in its axially outward position and pin 125 is opposite direct drive recess 129, any attempt while the drive is in motion to move the handle axially inward to thereby engage the clutch 25 is prevented by the engagement of one of the hook portions 93 with the rear surface of locking cam 40. If the drive is now stopped, the static friction between the belts 16 and the pad 106 may keep the pivot block 75 in a rocked position, thereby preventing axially inward movement of the handle 41. In this case, it is merely necessary to rotate the handle in a clockwise direction to bring the pin 125 opposite the loose spindle recess 128. As above explained, axially inward movement of the handle 41 in this position will cause the hook portion 93 to ride up on surfaces 73 or 71 respectively, thereby freeing the pad 106 from belts 16. The spring 96 will then return pivot block 75 to its neutral position as shown in Figure 11. The handle 41 can then be rotated to the direct drive position and moved axially inward, allowing the end of follower screw 135 to ride down on sloping surface 56, thereby engaging the clutch 25. Once the drive is in the direct drive condition, any attempt while the drive is in motion to move the handle 41 axially outward is prevented in the same manner as described above in connection with the loose spindle condition.

As described above, when the handle 41 is in its axially outward position, it can be moved to any position in the right quadrant short of the vertical position and in all such positions, the back gears will be engaged. However, with the gear in its axially outward position, the periphery of locking cam 40 bears against surface 113 of follower cam 111, thereby holding the pad 106 against the belt 16 and rocking the pivot block 75 to bring one of the hooks 93 into the path of axially inward movement of the locking cam 40. Thus, when the pin 125 is opposite the locked spindle recess 126, axial inward motion of the handle 41 and cams 39 and 40 is prevented, thereby preventing engagement of the clutch 25 while the drive is in motion. If the drive is now stopped, it may be found that static friction between the pad 106 and belts 16 will hold the hooks 93 in a position blocking axially inward movement of handle 41. In this situation, it is merely necessary to rotate the handle to the in-gear position and to push the handle axially inward. Movement of the handle 41 to this rotated position locates the locking cam 40 so that the sloping surface 72 is aligned with right hook portion 93 and sloping surface 71 is aligned with left hook portion 93. Axially inward movement of the handle 41 in this rotated position will cause either of the hook portions 93 to ride up on either of their respective sloping surfaces 71 or 72, thereby rocking the pivot block to its vertical position and freeing the pad 106 from the belts 16. The handle 41 may now be rotated to the locked spindle position and moved axially inward, allowing the end of cam follower screw 135 to ride down on surface 56a, whereby clutch 25 is engaged by counterclockwise movement of bell crank 130 actuated by spring 136. If the motor switch is closed while the drive is in locked spindle condition, either the drive between the motor and the pulley 24 will slip or the motor will be stalled.

Considering again the situation when the handle 41 is in its axially outward position for any rotated position within the right quadrant, the back gears will be engaged but the pad 106 will be held in engagement with belts 16. If the drive is now put into motion in either direction, axially inward movement of the handle 41 is prevented in all rotated positions except when the pin 125 is positioned opposite the in-gear recess 127 at which position, as noted above, the sloping surfaces 71 and 72 will be aligned with left and right hook portions 93 respectively. In this position, the handle may be moved axially inward to free the pad 106 from contact with the belts 16, thus preventing undue belt wear and loss of power when the drive is in the in-gear condition. Once the pin 125 is in the recess 127, if an attempt is made to pull the handle axially outward, the peripheral edge of cam 40 will bear against surface 114 and bring the pad into engagement with belts 16. If the drive is in motion, the pivot block 75 will be rocked so that either of the hook portions 93 will be brought into the path of axial movement of the cam 40, thus preventing axially outward movement of the handle 41.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a machine tool having a rotatable spindle, a drive member, gear and clutch means for drivingly connecting and disconnecting said drive member to said spindle, and a manually movable control assembly including a shaft mounted for limited rotary and axially inward and outward movement associated with said gear and clutch means for selecting a desired spindle condition; a locking assembly to prevent operation of said control assembly when said drive member is in motion comprising a locking cam means on said shaft, locking means movable to a position to restrict movement of said locking cam means, trip means associated with said locking means and a rotatable member of the machine tool which rotates when said machine tool is in operation, said trip means being operable to move said locking means to locking position when the shaft of said manually movable assembly is in an outwardly axial position and when the machine tool is in operation.

2. In a machine tool having a rotatable spindle, a drive member, gear and clutch means for drivingly connecting and disconnecting said drive member to said spindle, and a manually movable control assembly including a shaft mounted for limited rotary and axial movement associated with said gear and clutch means for selecting a desired spindle condition; locking cam means rigid with said shaft, a pivoting block means mounted on an axis substantially parallel to the axis of said shaft and adjacent to said locking cam means, at least one locking arm extending from said block to adjacent a side of said locking cam means, the block moving the arm in locking contact with said locking cam means when the block is pivoted, a cam follower associated with said block means and in contact with said locking cam means so as to be responsive to axial movement of said locking cam means when said shaft is axially moved by said control assembly, a trip means associated with said cam follower and movable by the cam follower to frictionally contact a rotatable member of the machine tool which rotates when the machine is in operation, the rotational movement of said rotatable member actuating said trip means to pivot said block means into a position to bring the locking arm in locking contact with said locking cam to prevent movement of said control assembly to a position to select another spindle condition when the machine tool is in operation.

3. The combination of claim 2 in which there is a means for urging the pivoting block means to a position where the arm thereon is out of contact with the locking cam when said trip means is out of contact with said rotatable member.

4. The combination of claim 2 in which the trip means comprises two angularly disposed rod extensions, one extension having said cam follower rigid thereon, the same extension on which the cam follower is mounted, being mounted for limited rotation on the pivoting block means, the other extension being adjacent said rotatable member and having a friction pad mounted thereon for contact with said rotatable member when said trip means is actuated.

5. In a machine tool having a rotatable spindle, a drive member, gear and clutch means for drivingly connecting and disconnecting said drive member to said spindle, and a manually movable control assembly including a shaft associated with said gear and clutch means for selecting a desired spindle condition; a substantially cylindrical locking cam rigid with said shaft, said cam having locking means thereon, a pivoting block mounted on an axis substantially parallel to the axis of said shaft and adjacent to said locking cam, a pair of locking arms extending from said pivoting block so as to be on opposite sides of said locking cam, a trip means comprising a pair of angularly disposed rod extensions, one rod extension being mounted for limited rotational movement on said pivot block, a rotatable member in said machine tool which rotates when the machine is in operation, the other rod extension being disposed adjacent said rotatable member, a friction means mounted on said other rod extension for contact with said rotatable member, a cam follower rigid with the rod extension which is mounted on the pivoting block, said cam follower being in contact with said locking cam and responsive to the axial movement of the locking cam, whereby said locking arms are moved in locking contact with said locking means when said friction means is moved in contact with said rotatable member when said machine tool is in operation, the rotatable member acting to pivot the pivoting block thereby restricting the movement of said locking cam.

6. The combination of claim 5 in which there is a means for urging said pivoting block to a position where said locking arms are out of locking contact with said locking cam.

7. The combination of claim 5 in which there is a means for urging said trip means to a position where the friction means is out of contact with said rotatable member.

8. The combination of claim 5 in which said pivoting block has a slot therein adjacent to and substantially parallel to the longitudinal axis of said cylindrical locking cam, a bore extending into said pivoting block and communicating with said slot, said rod extension mounted on said pivoting block being mounted in said bore and extending into said slot, said cam follower being rigidly mounted on a portion of said rod extending into said slot.

9. The combination of claim 8 in which said bore extends through said pivoting block and said rod extension mounted in the bore extends beyond the bore, a spring connected to a portion of the rod extending beyond the bore to rotatably urge the rod to a position where said friction means mounted on said other rod extension is out of contact with said rotatable member.

10. The combination of claim 5 in which the friction means is a leather pad and the rotatable member is a drive belt.

11. The combination of claim 5 in which said locking means on the locking cam comprise a plurality of projections extending from the cam, said locking arms on said pivoting block cooperating with said projections to restrict rotary movement of said locking cam.

12. The combination of claim 5 in which the locking cam has a plurality of sloping surfaces on the cylindrical surface thereof, the sloping surfaces cooperating with said locking arms when an arm is in locking position to urge the arm out of locking contact with the locking means on said locking cam.

References Cited in the file of this patent

UNITED STATES PATENTS

| | | |
|---|---|---|
| 2,043,783 | Tyler | June 9, 1936 |
| 2,241,677 | Sheldrick | May 13, 1941 |
| 2,306,418 | Wilson | Dec. 29, 1942 |
| 2,438,455 | Roeder et al. | Mar. 23, 1948 |